3,658,803
1,3-BENZOXAZINE DERIVATIVES

Luigi Bernardi, Severina Coda, Giselbert Karl Suchowsky, and Lorenzo Pegrassi, Milan, Italy, assignors to Società Farmaceutici Italia, Milan, Italy
No Drawing. Filed Apr. 30, 1968, Ser. No. 725,512
Claims priority, application Italy, Aug. 1, 1967, 19,067/67
Int. Cl. C07d 87/16
U.S. Cl. 260—244 R      4 Claims

ABSTRACT OF THE DISCLOSURE

Described are 1,3-benzoxazine-hydroxamic acids of the formula:

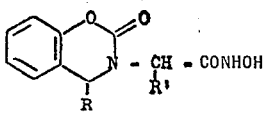

wherein R and R' are selected from the group consisting of hydrogen, a methyl and ethyl radical. The following are within the above formula: 3,4-dihydro-2-oxo-2H-1,3-benzoxazine-3-acetohydroxamic acid; 3,4-dihydro-4-methyl-2-oxo-2H-1,3-benzoxazine-3-acetohydroxamic acid; 3,4-dihydro-α-methyl-2-oxo - 2H - 1,3-benzoxazine-3-acetohydroxamic acid.

Also described is a process for preparing the compound which displays antidepressant properties.

---

Our invention relates to 1,3-benzoxazine derivatives and the process for the preparation thereof. More particularly are described hydroxamic acids of the structure:

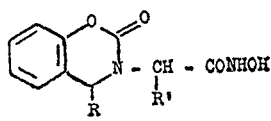

wherein R and R' are selected from the group consisting of hydrogen, methyl and ethyl, and the process for the preparation thereof.

The compounds of our invention display interesting pharmacological activities and may be usefully employed as anti-depressants.

Our process for the preparation of new 1,3-benzoxazine-2-one-3-(α-alkyl)-carbohydroxamic acids, optionally substituted in 4 position, consists in saponifying a lower alkyl ester of 1,3-benzoxazine-2-one-3-(α-alkyl)-carboxylic acid optionally substituted in 4 position and condensing the product with hydroxylamine to give the corresponding hydroxamic acid.

More particularly, a lower alkyl ester of the formula:

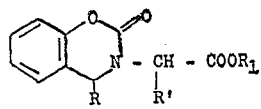

wherein R and R' are selected from the group consisting of hydrogen, methyl and ethyl and $R_1$ is alkyl of from 1 to 4 carbon atoms, disclosed in U.S. Pat. No. 3,427,313, filed Dec. 19, 1966 as Ser. No. 602,583, which corresponds to French Pat. No. 1,505,838, is dissolved in a suitable solvent such as an aliphatic alcohol having from 1 to 4 carbon atoms and subsequently saponified with alkali. The free acid thus obtained is dissolved in a suitable solvent and, through the mixed anhydride or the corresponding chloride, is reacted with hydroxylamine dissolved in a lower aliphatic alcohol having from 1 to 4 carbon atoms to yield the corresponding hydroxamic acid. Alternatively, the hydroxamic acid may be directly obtained from the ester by treatment with hydroxylamine base.

The compounds of the invention are solids crystalline stable to the light and to the heat. The compounds of our invention display very interesting pharmacological activities. They are useful in preventing the depression induced by reserpine.

3,4-dihydro-2-oxo - 2H - 1,3-benzoxazine-3-acetohydroxamic acid, among the derivatives belonging to the compounds of the invention, has been particularly studied. It has proven to be active in the prevention of the blepharoptosis induced by reserpine and in normalizing the hypothermia. Such a compound induces, when administered in mice at high doses (300–1000 mg./kg. per os), a clinical pattern of sedation and depression whose effects disappear within 5 hours.

Table 1 lists the data of the antidepressive activity of 4H-1,3-benzoxazine-2-one-3-acetohydroxamic acid in mice with respect to reserpine. This activity is also compared with the antidepressive activity shown by imipramine with respect to reserpine.

TABLE 1

| Compound | Doses, mg./kg. | Administration route | Ptosis | Rectal temperature in °C. |
|---|---|---|---|---|
| Controls | | | 0 | 37.9 |
| Reserpine (R) | 3.0 | Intraperitoneal | 40 | 32.1 |
| Imipramine plus R | 50.0 | do | 29 | 36.2 |
| 3,4-dihydro-2-oxo-2H-1,3-benzoxazine-3-acetohydroxamic acid plus R | 50.0 | do | 29 | 36.0 |
| Do | 100.0 | do | 5 | 38.1 |

Examination of the data in Table 1 shows that the compound of the present invention is at the same dosage of 50 mg./kg. as active as imipramine. However, the dose of 50 mg./kg. intraperitoneal represents the highest tolerated dose for imipramine, whereas 4H-1,3-benzoxazine-2-one-3-acetohydroxamic acid is tolerated to dose of 300 mg./kg. intraperitoneal. Normalization of reserpinized animals is already observed at a dose of 100 mg./kg.

The antireserpine action has been also tested on a female macaco rhesus monkey (weight 3.300 kg.). The animal was observed for two weeks in order to study its spontaneous behavior. The animal was injected with 3,4-dihydro-2-oxo - 2H - 1,3-benzoxazine-3-acetohydroxamic acid at a dose of 25 mg./kg. intramuscular and three hours after the treatment was injected with 0.75 mg./kg. intramuscular of reserpine. It has been observed that 3,4-dihydro-2-oxo - 2H - 1,3 - benzoxazine-3-acetohydroxamic acid has clearly reduced the reserpine symptomatology, that is hypothermia, tremor, blepharoptosis and alterations of the spontaneous behavior.

The strengthening of the hyperthermizing effect induced by norepinephrin has been tested for 3,4-dihydro-2-oxo-2H-1,3-benzoxazine-3-acetohydroxamic acid in comparison to the strengthening effect of imipramine. A slow endovenous infusion of norepinephrin causes hyperthermia in rats. This effect has been utilized to study the possible interference of 3,4-dihydro-2-oxo-2H-1,3-benzoxazine-3-acetohydroxamic acid with catecholamine, as already known for imipramine.

TABLE 2

| Compound | Mg./kg. intraperitoneal | Norepinephrin (60 μg./rat in 15') εΔ° C.± SE |
|---|---|---|
| Control | (1) | 2.7±0.89 |
| Imipramine | 25 | 7.26±1.91 |
| 3,4-dihydro-2-oxo-2H-1,3-benzoxazine-3-acetohydroxamic acid | 25 | 8.3±1.8 |

[1] Physiological solution.

From the above data there is a clear strengthening of the norepinephrin induced hyperthermia by 3,4-dihydro-2-oxo-2H-1,3-benzoxazine-3-acetohydroxamic acid.

The anti-aminoxidase (anti-MAO) activity has been studied in vivo and in vitro on hepatic and cerebral mitochrondria of rats. Inhibiting concentration 50 ($IC_{50}$) in vitro is the molar concentration of the substance able to reduce 50% of the mitochondrial monoaminoxidase activity. Inhibiting dose 50 ($ID_{50}$) in vivo is the quantity of the substance able to reduce 50% of the mitochondrial monoaminoxidase activity. The data obtained are reported in Table 3.

TABLE 3

| Organ | Inhibiting compound | In vitro, $IC_{50}$ | In vivo, $ID_{50}$ mg./kg./os |
| --- | --- | --- | --- |
| Liver | Iproniazide | $1.5 \times 10^{-5}$ mol | 1.35 |
|  | 3,4-dihydro-2-oxo-2H-1,3-benzoxazine-3-acetohydroxamic acid. | $4 \times 10^{-3}$ mol | [1] 200 |
| Brain | Iproniazide | $1.2 \times 10^{-5}$ mol | 8.06 |
|  | 3,4-dihydro-2-oxo-2H-1,3-benzoxazine-3-acetohydroxamic acid. | $3 \times 10^{-3}$ mol | [1] 200 |

[1] Inactive.

From the above data it can be seen that 3,4-dihydro-2-oxo-2H-1,3-benzoxazine-3-acetohydroxamic acid shows a very weak anti-MAO activity which can be explained by a direct effect of the substance on mitochondria. In fact, 3,4-dihydro-2-oxo - 2H - 1,3-benzoxazine-3-acetohydroxamic acid in vivo is completely inactive.

The acute toxicity ($LD_{50}$) of 3,4-dihydro-2-oxo-2H-1,3-benzoxazine-3-acetohydroxamic acid determined on albino male mice (weight about 20 g.) of oral route has been determined 48 hours after administration of the compound. This datum was at least 5 times lower than the toxicity of imipramine as shown from the data in Table 4.

TABLE 4

Compound: $LD_{50}$ mg./kg. per os
Imipramine _____ 487.5
3,4 - dihydro-2-oxo-2H-1,3-benzoxazine-3-acetohydroxamic acid _____ >2000.0

The antidepressive effect of 3,4-dihydro-2-oxo-2H-1,3-benzoxazine-3-acetohydroxamic acid in respect to reserpine has furthermore been studied, observing the normalization of behavior which the administration of this compound causes in a swimming reserpinized rat. The experiment consists in placing the animal into a basin full of water and measuring the time taken by the rat to reach the edge of the basin by swimming and to get out of it. A nontreated rat generally takes 7–8 seconds to overcome this test, while a reserpinized rat displays irregular swimming which consists only of movements which allow the animal to remain afloat. In those cases in which the animal is successful to reach safety, the time spent is much higher.

Table 5 reports the data obtained from this experiment. The test had been carried out 5 hours after the administration of the compounds under examination.

TABLE 5

| Compound | Dose, mg./kg. intraperitoneal | Average time to get out of the basin (in seconds) | Number of animals which do not get out |
| --- | --- | --- | --- |
| Controls | | 7 | 0/5 |
| Reserpine (R) | 5 | 35 | 1/5 |
| Imipramine plus R | 25 | 7 | 0/5 |
| 3,4-dihydro-2-oxo-2H-1,3-benzoxazine-3-acetohydroxamic acid plus R | 25 | 10 | 0/5 |

The following examples serve to illustrate the inventiontion without limiting it.

EXAMPLE 1

3,4-dihydro-2-oxo-2H-1,3-benzoxazine-3-acetohydroxamic acid 10 g. of ethyl 3,4 - dihydro - 2 - oxo-2H-1,3-benzoxazine, - 3 - acetate (or ethyl 2-oxo-2H-1,3-benzoxazine-3 (4H)-acetate) dissolved in 100 cc. of ethyl alcohol are saponified with 52.5 cc. of N NaOH. After evaporation of the ethyl alcohol are saponified with 42.5 cc. of N NaOH. After evaporation of the ethyl alcohol, the aqueous solution of the sodium salt is acidified and 7.5 g. of 3,4-dihydro-2-oxo-2H-1,3-benzoxazine-3-acetic acid (or 2-oxo-2H-1,3-benzoxazine-3 (4H)-acetic acid) are obtained, which after crystallization from alcohol-water (1:1) appears as white crystals melting at 170–171° C. 3.5 cc. of triethylamine and 2.5 g. of ethyl chlorocarbonate dissolved in 20 cc. of tetrahydrofurane are added to 5 g. of the above acid dissolved in 50 cc. of tetrahydrofurane and cooled over ice. After half an hour, the precipitate is filtered. To the liquid, filtered and cooled, 2 g. of hydroxylamine hydrochloride dissolved in 50 cc. of methanol followed by a solution of sodium methylate prepared starting from 670 mg. of metal sodium are added at 0° C. The mixture is stirred for 2 hours at 0° C., the solvent evaporated off, pulped in water and filtered. By crystallization from alcohol 2.2 g. of 3,4-dihydro-2-oxo-2H-1,3-benzoxazine-3-acetohydroxamic acid are obtained, melting at 187–189° C. (with decomposition).

EXAMPLE 2

3,4 - dihydro-4-methyl-2-oxo-2H-1,3-benzoxazine-3-acetohydroxamic acid (or 4-methyl-2-oxo-2H-1,3-benzoxazine-3 (4H)-acetohydroxamic acid)

The operation is as described in Example 1 with the difference that the starting material consists of ethyl 3,4-dihydro - 4 - methyl - 2 - oxo-2H-1,3-benzoxazine-3-acetate (or ethyl 4-methyl-2-oxo-2H-1,3-benzoxazine-3-(4H)-acetate). After saponification and reaction with hydroxylamine it gives 3,4-dihydro-4-methyl-2-oxo-2H-1,3 - benzoxazine-3-acetohydroxamic acid (or 4-methyl-2-oxo-2H-1,3-benzoxazine-3 (4H)-acetohydroxamic acid).

EXAMPLE 3

3,4 - dihydro-α-methyl-2-oxo-2H-1,3-benzoxazine-3-acetohydroxamic acid (or α-methyl-2-oxo-2H-1,3-benzoxazine-3 (4H)-acetohydroxamic acid)

The operation is carried out as described in Example 1 with the difference that the starting material consists of ethyl 3,4-dihydro-α-methyl-2-oxo-2H-1,3-benzoxazine 3 - acetate (or ethyl-α-methyl-2-oxo-2H-1,3-benzoxazine-3(4H)-acetate). After saponification and reaction with hydroxylamine, it gives 3,4-dihydro-α-methyl-2-oxo-2H-1,3-benzoxazine-3-acetohydroxamic acid (or α-methyl-2-oxo-2H-1,3-benzoxazine-3 (4H)-acetohydroxamic acid).

We claim:
1. A compound of the formula:

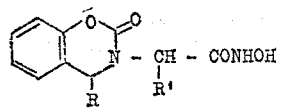

wherein R and R' are selected from the group consisting of hydrogen, methyl and ethyl.

2. The compound of claim 1, which is 3,4-dihydro-2-oxo-2H-1,3-benzoxazine-3-acetohydroxamic acid.

3. The compound of claim 1, which is 3,4-dihydro-4-methyl - 2 - oxo - 2H-1,3-benzoxazine-3-acetohydroxamic acid.

4. The compound of claim 1, which is 3,4 - dihydro-α-methyl - 2 - oxo - 2H - 1,3 - benzoxazine-3-acetohydroxamic acid.

References Cited
UNITED STATES PATENTS

| | | | |
|---|---|---|---|
| 2,803,649 | 8/1957 | Hodge | 260—500.5 H |
| 3,427,313 | 2/1969 | Bernardi et al. | 260—244 |
| 3,444,232 | 5/1969 | Bernstein | 260—500.5H |
| 3,446,804 | 5/1969 | Shavel et al. | 260—244 |

FOREIGN PATENTS

| | | | |
|---|---|---|---|
| 744,307 | 2/1956 | Great Britain | 260—500.5 H |
| 1,003,113 | 9/1965 | Great Britain | 260—244 |

OTHER REFERENCES

Noller, Chemistry of Organic Compounds, 2nd ed., p. 170, Philadelphia, Saunders, 1958.

Takahashi et al., German Application 1,147,583, April 1963.

Chemical Abstract Subject Index, A–K, vol. 69, p. 479S (July-December, 1968–1969).

NATALIE TROUSOF, Primary Examiner

U.S. Cl. X.R.

424—248